United States Patent [19]

Davis et al.

[11] 4,387,021
[45] Jun. 7, 1983

[54] SYSTEM FOR HANDLING EXHAUSTED VERMICULITE CATION EXCHANGE MATERIALS

[75] Inventors: Stephen H. Davis, Dayton, Ohio; James E. Etzel, Lafayette, Ind.; Robert E. Wiegert, Middletown, Ohio

[73] Assignee: Water Refining Company, Inc., Middletown, Ohio

[21] Appl. No.: 251,459

[22] Filed: Apr. 6, 1981

[51] Int. Cl.³ ............................................. B01J 49/00
[52] U.S. Cl. ................................... 210/96.1; 210/189; 210/279
[58] Field of Search ............... 210/662, 670, 677, 688, 210/743, 96.1, 189–191, 194, 205, 208, 241, 258, 269, 275, 101, 279

[56] References Cited

U.S. PATENT DOCUMENTS

| | | | |
|---|---|---|---|
| 2,572,082 | 10/1951 | Welsh | 210/660 |
| 2,973,319 | 2/1961 | Porter | 210/675 |
| 3,208,934 | 9/1965 | Kingsbury | 210/675 |
| 3,515,277 | 6/1970 | Kingsbury et al. | 210/676 |
| 3,531,401 | 9/1970 | Crits | 210/677 |
| 3,630,365 | 12/1971 | Woodbridge et al. | 210/241 |
| 4,057,494 | 11/1977 | Chopra | 210/675 |
| 4,100,065 | 7/1978 | Etzel | 210/688 |
| 4,105,549 | 8/1978 | Kakumoto et al. | 210/189 |
| 4,126,550 | 11/1978 | Doerschlag | 210/743 |
| 4,166,032 | 8/1979 | Hanway et al. | 210/688 |
| 4,210,530 | 7/1980 | Etzel et al. | 210/688 |

*Primary Examiner*—Ivars C. Cintins
*Attorney, Agent, or Firm*—Biebel, French & Nauman

[57] ABSTRACT

A system for handling exhausted vermiculite cation exchange particles after they have been used for the removal of heavy metal ions from waste effluents. The exhausted particles are stabilized and removed from the ion exchange column. Stabilization may be by acid solution recirculation through the column prior to particle removal. This is accomplished by preferably using a portable stabilization unit. The stabilized particles are removed from the column by a flushing, backwashing arrangement. After drying, the particles, which are non-hazardous, may be used in a land fill or they may be expanded to produce a lightweight aggregate, insulation, or agricultural material.

8 Claims, 4 Drawing Figures

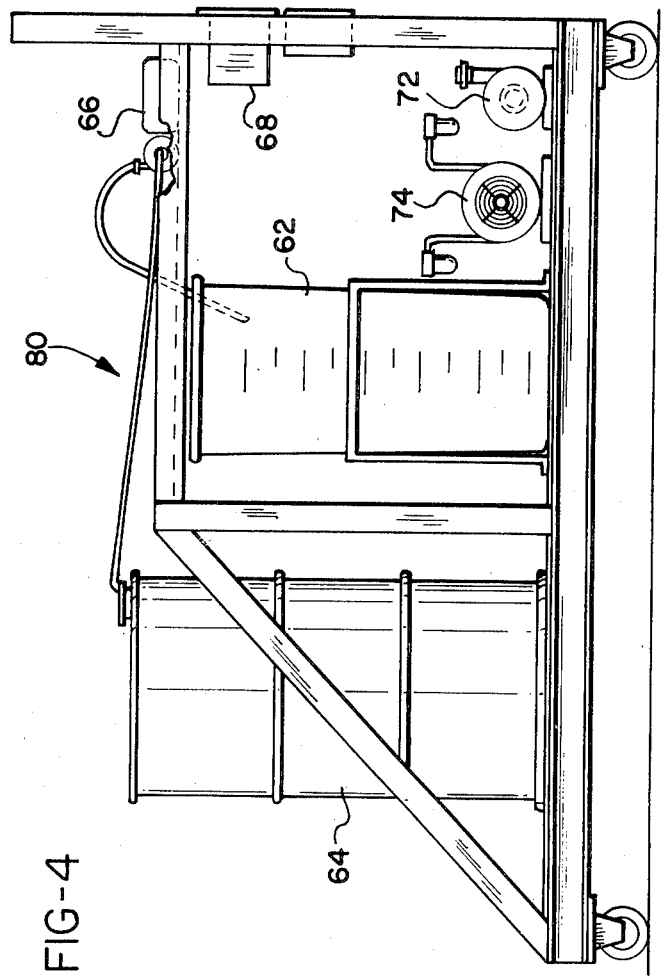

SYSTEM FOR HANDLING EXHAUSTED VERMICULITE CATION EXCHANGE MATERIALS

BACKGROUND OF THE INVENTION

This invention relates to a system for handling treatment materials such as those used in removing multivalent heavy metals and metal cyanide ions from metal plating waste effluents. More particularly, this invention relates to a system for stabilization and removal of exhausted vermiculite particles from a cation exchange column and for drying and, possibly, expanding the stabilized particles to produce a useful byproduct.

Metal plating is used to improve surface properties of metallic and nonmetallic products by coating a relatively thin, adherent layer of metal onto an object. Electroplating is the most common and important of the various metal plating processes. Metals commonly used in electroplating processes include nickel, copper, chromium, zinc, gold, silver, cadmium, and tin.

There are two basic types of metal plating baths used in electroplating processes. They are the simple salt (or "acid" bath) and the complex ion bath, with cyanide being the most commonly used complex ion. For example, copper can be plated from either an acid or an alkaline bath. If an acid bath is used, the following simplified explanation is typical of the plating process. Two electrodes are immersed in a copper sulfate solution and connected to a direct current electrical source. When current is applied, copper ions in solution migrate toward the negative electrode (cathode) which can be the article to be plated. The positive electrode (anode) is of copper and is the source of new copper ions in solution to replace those which are plated onto the article.

When an alkaline plating bath is used, cyanide is the anion in solution and forms a complex with the heavy metal ion to be plated. Commercial alkaline copper and zinc metal plating baths usually contain cyanide as the complexing ion; cadmium plating baths almost always use cyanide. Typical cyanide concentration in such baths may range from 15,000 to 100,000 mg/l.

Ion exchange has been utilized to concentrate both cyanide-heavy metal complexes and heavy metal ions in plating waste effluents to facilitate their later removal or recovery. An important advantage of ion exchange treatment is the savings of water due to recirculation of treated water. However, past methods using ion exchange have also suffered shortcomings including the presence of impurities in the waste which are destructive to ion exchange resins, the presence of interfering ions, a limited loading capacity of ion exchange columns, and relatively high operating costs. Even after regeneration, the metal ion precipitated from the spent regenerant solution constitutes a sludge that is difficult to dispose of in an acceptable manner.

U.S. Pat. No. 4,100,065 to Etzel represents an improved cation exchange process for removing heavy metal ions from metal plating waste effluents. That process involves the use of exfoliated vermiculite particles as the cation exchange material. A number of ways to treat the exhausted exfoliated vermiculite particles are mentioned by Etzel. Included is the possibility of regenerating the particles for reuse as ion-exchange resins. Another possibility listed is to further expand the ion-depleted vermiculite and, then, use it as a lightweight insulation, packaging material or filler material.

In Etzel et al U.S. Pat. No. 4,210,530 there is disclosed an improvement on the process of U.S. Pat. No. 4,100,065. That improvement is to use an unexpanded vermiculite as the cation exchange material. Again the disclosed methods for handling of the exhaused vermiculite particles include regeneration and expansion of the removed particles.

However, in practice, these handling methods are not as easily accomplished as might at first appear. Regeneration for the purpose of reuse is not economically feasible. The amount of chemicals used, the costs involved, and the disposal problems created by the used regenerating solution, all make it unfeasible at the present time to regenerate the exhausted vermiculite particles.

Accordingly, disposal of the exhausted vermiculite is the only viable approach. Even then, the exhausted vermiculite particles must be removed from the column. The problem encountered is that the wet vermiculite particles cannot be easily removed from the column in condition for ready disposal. The wet particles are difficult to dewater, dry and/or transport. More importantly, removal of the wet vermiculite particles results in carrying some of the heavy metal contaminants out of the column. These heavy metal ions are ones which have not been fixed to the vermiculite particles by the ion exchange process, of if theoretically attached, they are easily leached from the particles under ordinary disposal conditions, although, ordinary water washes are not sufficient to rid the spent vermiculite of these contaminants. This means that the exhausted vermiculite particles cannot be simply removed and sent to a land fill because of the presence of possible toxic leachants.

Accordingly, the need exists for an efficient and effective means for removal and treatment of exhausted vermiculite particles from an ion exchange column which will result in production of a useful byproduct or at least one which may be disposed of safely.

SUMMARY OF THE INVENTION

The present invention meets that need by providing a system for handling the exhausted vermiculite particles used in the processes of U.S. Pat. Nos. 4,100,065 and 4,210,530, or those used in any similar process.

In the process itself, multivalent heavy metal ions are removed from metal plating liquid wastes by contacting the wastes with a vermiculite cation exchange material which may be exfoliated (U.S. Pat. No. 4,100,065) or unexpanded (U.S. Pat. No. 4,210,530) or mixtures of the two. The particular vermiculite material used has a particle size of preferably less than 10 mesh, or of about 0.0067 in. to about 0.0234 in., and a cation exchange capacity of over 70 milliequivalents per 100 grams of material. The cation exchange capacity of the vermiculite varies depending upon the particular multivalent metal ion present, being lowest for zinc and highest for nickel. The vermiculite also functions effectively to remove mixtures of heavy metal ions from waste streams.

Where cyanide is also present in the waste stream, it will almost always form complexes with the heavy metal ions in the waste. In order to free those heavy metal ions from the cyanide complexes and render them in ion exchangeable form for vermiculite treatment, they must first be pretreated to destroy the cyanide complexes. This can be accomplished in a number of different ways as disclosed in U.S. Pat. No. 4,210,530.

Whether or not a cyanide removal operation is used, the vermiculite in the column will eventually become exhausted by reason of the absorption of the heavy metal cations and the depletion of exchangeable ions in the vermiculite lattice. Even prior to exhaustion, a point is reached where the column is not as efficient as it initially was. This is termed the breakthrough point and may be experimentally determined by monitoring the output of the column (watching for an increase in heavy metal ion concentration) or by quantitatively preparing breakthrough-exhaustion curves for a given size column. Depending upon the type of operation and the number of vermiculite columns in series utilized, replacement of a column will be dictated by either the breakthroough or exhaution point. For the purpose of the present application the particles which are considered spent will be termed "exhausted vermiculite particles" even though it should be realized that true theoretical exhaustion may not actually have occurred.

At the appropriate point, the column of exhausted vermiculite is taken off stream in terms of the flow of heavy metal ion containing waste water through the column. For this reason, it is desirable in the system of the present invention to use multiple columns so that the waste effluent can be continuously treated by diversion to another column containing unexhausted vermiculite while the exhausted column is refilled with fresh vermiculite.

The system of the present invention is designed at this stage to provide for the stabilization and removal of the exhausted vermiculite. Preferably this is done by attachment of a portable stabilization unit to the column of exhausted vermiculite. That stabilization unit includes a wheeled base supporting a recirculation pump, a mixing tank containing a pH monitor, an acid supply means, and a vacuum pump. The portable stabilization unit is moved into place next to the column in which the exhausted vermiculite is to be stabilized and removed. All of the fluid connections to the column are made, and the stabilization process begun.

Fresh water is added to the mixing tank along with a supply of concentrated acid, such as hydrochloric acid, from an acid supply tank and, fed through an acid feeder. Acid is added until a pH of approximately 4–4.5 is established. The pH is controlled by reference to the pH monitor which is connected to the mixing tank. Once the proper initial pH is established, the recirculation pump circulates the said solution from the mixing tank, into and through the exhausted vermiculite column where it joins with any solution remaining in the column, and, then, is flowed back to the mixing tank. Additional acid is added in the mixing tank as needed to reestablish the 4–4.5 pH level. This process is repeated continuously until the solution stabilizes at that pH level.

Once the pH level stabilizes, the solution is then recirculated through the column for a period of time, such as overnight. This serves to not only wash any loose heavy metal ions from the vermiculite particles, but also to partially regenerate the vermiculite cation exchange particles. The degree of partial regeneration is around 2–10%, and preferably 6%, of cation exchange capacity.

Partial regeneration of this order serves to completely stabilize the exhausted vermiculite particles. The stabilized particles have been found to meet all EPA specifications for resistance to leaching of toxic substances from the particles. As such, they may be disposed of in any type of approved land fill.

Removal of the particles from the column takes place following stabilization. The acid solution is sent back to the original waste effluent holding sump, from which it passes through a fresh vermiculite column along with the waste effluent to be treated. Two or so bed volumes of rinse water are also directed to the sump.

Following the rinse step, an exit port in the side of the column is opened and a volume of the wet, flowable but stabilized vermiculite particles are drawn off using a water flush. The column is preferably one wherein an upper portion contains the vermiculite particles, and a bottom portion contains a gravel or sand bed, sandwiched between a separator material such as a garnet layer. The gravel or sand bed and garnet layer support the vermiculite particles and, in addition, serve as a filter of sorts for the treated waste water before it passes out of the column. The exit port extends through the sand or gravel bed and the opening of the exit port is at the level of the sand or gravel bed and the garnet layer.

Since not all of the vermiculite particles will be removed by the water flush, a backwash of water is used to lift the remaining particles off of the supporting bed and wash them out through the exit port.

After the column is evacuated, a fresh batch of unexpanded vermiculite is introduced into the column through an entry port. Tap water is used to pre-wet the particles and a vacuum drawn on the column to condition the fresh vermiculite particles prior to start of flow of waste effluent through the column.

With regard to the stabilized particles which have been removed from the column, these are dewatered and/or dried and then, preferably transported to a land fill area for toxically safe and environmentally sound disposal. Alternatively, they may be heated to expand the vermiculite particles. Thus, the stabilized particles may be expanded by placing them in a 700°–800° C. oven. The expanded material has the same appearance, bulk, and structure of commercially sold expanded vermiculite and may be used for the same packaging, insulation, aggregate, and soil conditioning purposes.

Accordingly, it is an object of the present invention to provide an efficient and effective system for handling exhausted vermiculite particles from a cation exchange column; to provide a stabilizing unit for stabilizing the particles prior to removing them from the column, to provide a column arrangement which may be used effectively with the stabilization and removal apparatus, and to provide toxically safe and environmentally sound stabilized vermiculite particles upon removal from the column.

Other objects and advantages of the invention will be apparent from the following description, the accompanying drawing and the appended claims.

BRIEF DESCRIPTION OF THE DRAWINGS

FIG. 4 is a side view of the portable stabilization unit used with the column of FIGS. 1 and 3.

DETAILED DESCRIPTION OF THE PREFERRED EMBODIMENTS

Figure 1:
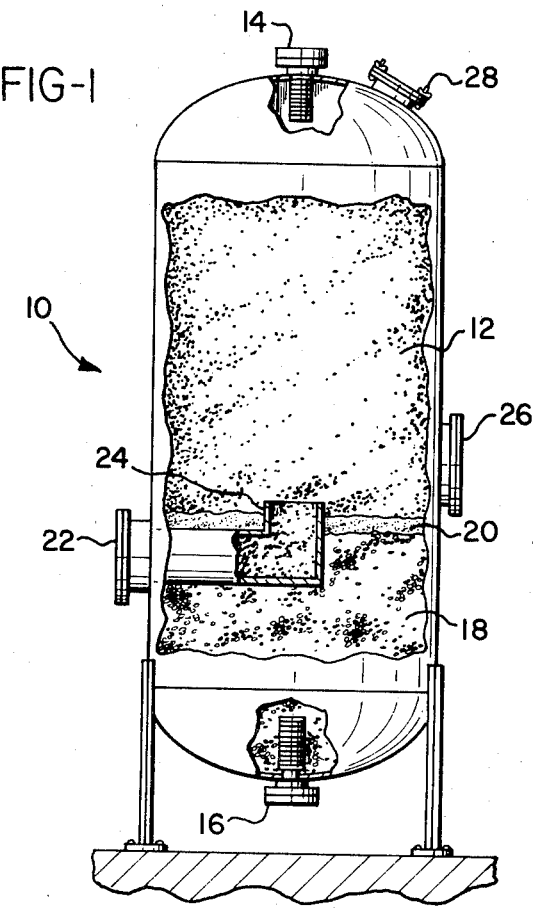
FIG. 1 is a sectional view of a vermiculite cation exchange column of the preferred embodiment.

Referring to FIG. 1, there is shown a cation exchange column 10, having an upper portion containing vermiculite particles 12. As mentioned, these particles may be either exfoliated or unexpanded as long as they have a sufficient cation exchange capacity to remove the desired heavy metal ions from waste effluents. In the simplified version shown in this Figure, a waste effluent inlet is shown at the top at 14 and the outlet at the bottom at 16.

Figure 3:
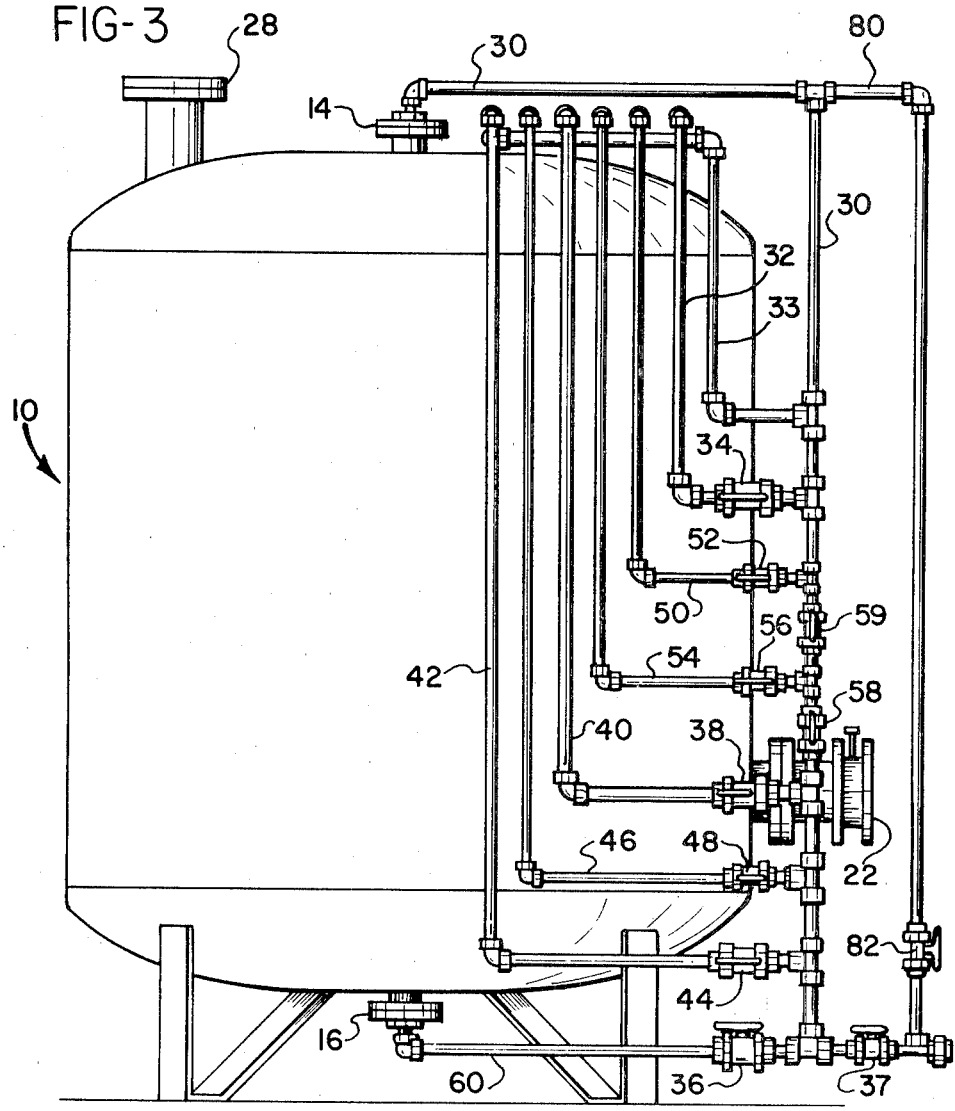
FIG. 3 is a side view of the column of FIG. 1 showing the valving used with the stabilization and removal system.

The flow of waste effluent through the column is better illustrated in FIG. 3 which shows a side view of column 10 with the appropriate piping attached. The main fluid inlet is through inlet pipe 30 fed by a waste effluent sump (not shown) or other supply of waste effluent to be treated. The main fluid outlet is through outlet pipe 60. During the cation exchange treatment of the waste effluent, the effluent enters through wastewater-in pipe 32 and open valve 34 into inlet pipe 30 for downward flow through column 10. Following passage through the column, the treated waste effluent flows through outlet pipe 60, open valve 36 and through open valve 38 out through waste-water-out pipe 40. Pipe 40 may be directed to the sewer where the treated waste effluent, having the heavy metal ions removed, is ecologically discarded. During the process all other valves shown in FIG. 3 are closed. Alternatively, the treated waste water may be directed through interconnect pipe 42 (by opening valve 44 and closing valve 38) for flow of the effluent through another column or columns similar to 10 for additional treatment (interconnect pipe 33 being used for flow from other columns into column 10 in the reverse situation).

Figure 2:
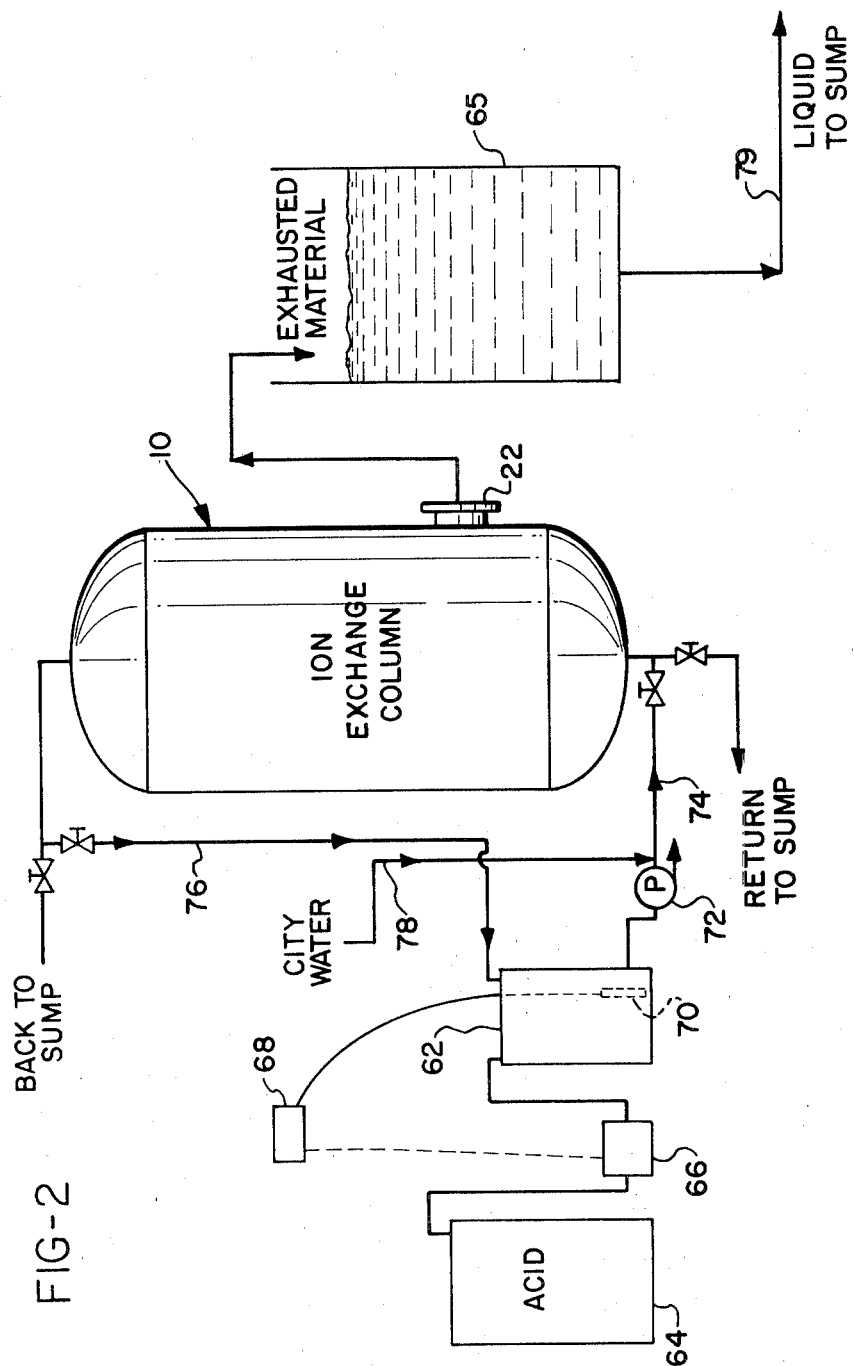
FIG. 2 is a schematic of the exhausted vermiculite stabilization and removal system used in the present system.

Once the vermiculite particles within the column become exhausted (or it is otherwise desirable to replace them), valves 34 and 38 are closed to stop the flow of waste effluent through the column 10 and take column 10 off stream. In order to stabilize the exhausted vermiculite particles for safe disposal after their removal from the column, a stabilization system such as that shown schematically in FIG. 2 is used. A portable stabilization unit 80 for carrying out the stabilization step is shown in FIG. 4, where like numerals have been used to the extent possible. The portable stabilization unit 80 is on a wheeled base for easy movement to the column needing vermiculite stabilization and removal.

Mixing tank 62 is initially filled with a mixture of tap water and concentrated acid, such as hydrochloric acid. The acid is supplied by acid supply tank 64, which in FIG. 4 is shown as a 55 gallon drum. Feed of the acid from acid supply tank 64 to mixing tank 62 is accomplished with acid feeder 66 which is controlled by pH monitor 68. Thus, a pH probe 70 located within mixing tank 62 senses the pH of the solution in the mixing tank 62 and pH monitor 68 will, when in operation, control the feed of acid through acid feeder 66 until a pH of approximately 4–4.5 is established within mixing tank 62.

After that initial pH is established for the acid solution, recirculation pump 72 is used to flow the acid solution upwardly through the column; although, it could be a downward flow instead. The acid solution is flowed into the column through line 74 and back through line 76 for reentry into mixing tank 62. Referring back to FIG. 3, line 74 of FIG. 2 is equivalent to recirculation-in pipe 46 the flow through which is controlled by valve 48. Line 76 of FIG. 2 is equivalent to recirculation-out pipe 50 the flow through which is controlled by valve 52. When valves 48 and 52 are open, all other valves in FIG. 3, except valve 36, will be closed. In practice recirculation-in pipe 46 is removably connected to recirculation pump 72 on stabilization unit 80 of FIG. 4. Recirculation-out pipe 50 is then removably connected to mixing tank 62 on stabilization unit 80.

Upon reentry of the acid solution into mixing tank 62, pH monitor 68 will control introduction of concentrated acid from acid tank 64 through acid feeder 66 to again establish the pH of approximately 4–4.5. This procedure is repeated until the established pH becomes essentially constant. At that point recirculation pump 72 recirculates the acid solution through the column 10 for a given period of time, such as overnight. At the completion of recirculation, the acid solution is sent to the waste effluent sump (not shown) for flow along with the waste effluent to be treated through a column containing fresh or unexhausted vermiculite.

At this point, approximately two bed volumes of rinse water are used to wash the vermiculite particles of acid solution. In FIG. 2 the fresh water, which may be tap or city water, is shown entering through line 78. Referring to FIG. 3, the fresh water-in pipe 54 is used to bring the rinse water into the column. Valve 48 is shut and pump 72 is turned off to stop flow of acid solution, and valves 56 and 58 are opened for the countercurrent flow of rinse water through column 10 and out recirculation-out pipe 80 and, then, to the waste effluent sump (not shown) through valve 82. Valve 37 also opens to the sump should downward rinsing be used or should it be necessary to direct any of the other effluents coming out of outlet pipe 60 to the sump.

Following rinsing, the vermiculite particles, which are now stabilized, are removed from the column. This is undertaken through vermiculite exit port 22, which is best shown in FIG. 1.

Exit port 22 extends through gravel bed 18 and has an opening 24 at the level of the top of gravel bed 18 and garnet layer 20. Of course other separating materials in addition to garnet may be used, such as woven or nonwoven fiberglass, nylon cloth, etc. Likewise other silaceous particulate materials such as sand can be used in place of the gravel in bed 18. Inspection port 26 is used as a possible alternative means for removal of vermiculite particles 12, but more often simply to inspect the condition of the gravel bed 18 and top garnet layer 20, as well as the interior of column 10, after the stabilized exhausted vermiculite particles are removed and before fresh ones are introduced through entry port 28.

With reference to FIG. 3, the removal process is undertaken by flushing the stabilized vermiculite particles from the column by opening valves 56 and 59 so that tap water enters through fresh-water-in pipe 54 and, then, inlet pipe 30. Exit port 22 (controlled by a butterfly valve) is also opened so that the water flushes most of the vermiculite particles out of the column. It will not, however, remove all of the particles. For this purpose, a backwash is used. Water entering through fresh-water in pipe 54 is directed upwardly through the column by shutting valve 59 and opening valve 58. It enters through outlet pipe 60 and up through the gravel bed to wash any remaining particles off of the top garnet layer and out through exit port 22.

Following backwashing, all valves are shut and fresh vermiculite particles are introduced into the column through entry port 28 (FIGS. 1 and 3). This fresh vermiculite should be conditioned prior to placing column 10 back on stream for waste effluent treatment. Thus, the tank is partially filled with water, which may be flowed in through fresh-water-in pipe 54 and inlet pipe 30. Following this, a vacuum is drawn on the column 10. This may be done thruogh recirculation-out pipe 50 by at this point connecting the end of that pipe to a vacuum pump such as 74 (see FIG. 4). The drawn vacuum is maintained for around 10-12 hours. It is released through the introduction of waste effluent and the column is, then, returned to the treatment cycle.

In the preferred embodiment the system is sized so that there occurs one tank exhaustion per week, with a sufficient number of other tanks used in series (or held in reverse) so that the exhausted tank may be taken off stream, the exhausted vermiculite particles stabilized and removed, and the column filled with fresh vermiculite without any interruption in the plant's waste effluent treatment process.

As shown in FIG. 2, the stabilized exhausted vermiculite is water flushed through exit port 22 to a drying or dewatering device 65. Although wet, the stabilized vermiculite is now easily dried or dewatered, with the drawn off water sent to the sump through line 79. The dried, stabilized vermiculite particles have been found to meet EPA regulation 40 CFR, part 261, to be classified as a non-hazardous waste. As such it may be disposed of in any ordinary land fill.

Alternatively, it may be expanded by heating (either as a part of the drying or as a separate treatment later) to above about 700° C. As is known, vermiculite heated to this temperature expands (pops like popcorn) to produce a lightweight aggregate, insulation, or agricultural material. Since it has been stabilized prior to removal from the column, there is no danger of leaching of toxic substances from stabilized vermiculite which is expanded and used in this manner.

Thus, the present invention provides a complete system for handling the vermiculite particles used in the removal of heavy metal ions by a cation exchange process and for the production of a useable, stable byproduct of the system.

While the system, apparatus and byproduct therein described constitute the preferred embodiment of the invention, it is to be understood that the invention is not limited to this precise system, apparatus or byproduct, and that changes may be made therein without departing from the scope of the invention.

What is claimed is:

1. A system for the stabilization and removal of exhausted vermiculite particles from an ion exchange column, comprising:
   (a) a column having a vermiculite particle containing area, means to support and retain said vermiculite particles and means for flowing waste effluent from a holding sump into and out of said column during the ion exchange treatment process conducted within said column, said column also having an exit port through which exhausted vermiculite particles are removed from the column and an entry port through which fresh vermiculite particles are introduced into the column,
   (b) a mixing tank into which an acid solution is placed at an established pH,
   (c) means to circulate and recirculate said acid solution through said ion exchange column and back to said mixing tank after said vermiculite particles have become exhausted and the ion exchange treatment process within said column has been discontinued,
   (d) means to monitor the pH of the recirculated acid solution upon reentry into said mixing tank and to at that time add additional acid as needed to maintain the established pH,
   (e) means to direct the recirculated acid solution to the waste effluent holding sump after said exhausted vermiculite particles have been partially regenerated and thereby stabilized,
   (f) means to flush a volume of stabilized vermiculite particles out through said exit port,
   (g) means to backwash with fresh water through said means to support and retain said vermiculite particles so that any remaining volume of stabilized vermiculite particles are removed from said column through said exit port, and
   (h) means to dewater said stabilized and removed vermiculite particles for ready disposal.

2. The system of claim 1 wherein said means to support and retain said vermiculite particles is a sand or gravel bed located in the bottom of said column.

3. The system of claim 2 wherein a top separator material layer separates said sand or gravel bed and said vermiculite particle containing area.

4. The system of claim 3 wherein said exit port extends through said sand or gravel bed and the opening to said exit port is at the level of the top of said top separator material layer.

5. The system of claim 1 wherein said mixing tank, said means to circulate and recirculate the acid solution, and said means to monitor the pH are arranged on a portable stabilization unit which may be moved from one column to another.

6. The system of claim 5 wherein said means to circulate and recirculate the acid solution is a pump in fluid connection with said mixing tank and removably connected to said column, said mixing tank also being removably connected to said column for reentry of said acid solution during recirculation.

7. The system of claim 6 wherein said portable stabilization unit also includes an acid supply tank connected to an acid feeder means, which feeds the acid to said mixing tank.

8. The system of claim 5 wherein said portable stabilization unit also includes a vacuum pump which is removably in fluid connection with said column in order to draw a vacuum in said column and facilitate conditioning of fresh vermiculite particles which have been placed in said column following removal of said stabilized vermiculite particles.

* * * * *